Figure 1:
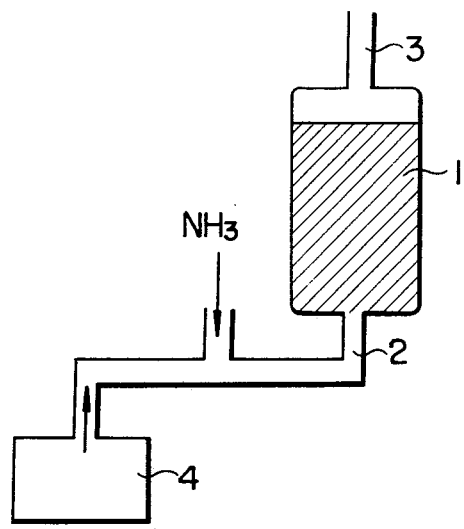

United States Patent [19] [11] 3,961,020
Seki [45] June 1, 1976

[54] PROCESS FOR REMOVING SULFUR OXIDES AND NITROGEN OXIDES FROM FLUE GASES USING HALOGEN-IMPREGNATED ACTUATED CARBON WITH SIMULTANEOUS INJECTION OF AMMONIA

[75] Inventor: Michiharu Seki, Fuchu, Japan

[73] Assignee: Hitachi, Ltd., Japan

[22] Filed: Oct. 5, 1973

[21] Appl. No.: 403,832

[30] Foreign Application Priority Data
Oct. 9, 1972  Japan............................ 47-100685
Oct. 23, 1972 Japan............................ 47-105301
Nov. 13, 1972 Japan............................ 47-113005

[52] U.S. Cl................................. 423/239; 423/244
[51] Int. Cl.² .................... B01J 8/00; C01B 21/00; B01D 53/34
[58] Field of Search.............. 423/239, 240, 244; 55/681, 74; 252/411 S, 445

[56] References Cited
UNITED STATES PATENTS
3,050,363  8/1962  Veal ................................... 423/239
3,502,427  3/1970  Johswich ............................... 55/74
3,578,390  5/1971  Kruel et al. .......................... 423/244
3,766,090  10/1973 Juntgen et al. ....................... 423/244

FOREIGN PATENTS OR APPLICATIONS
1,271,687  4/1968  Germany ............................ 423/239
1,090,306  11/1966 United Kingdom................. 423/244
  180,024  5/1922  United Kingdom................. 423/244
3,373,348  8/1930  United Kingdom................. 423/244
  478,877  1/1938  United Kingdom................. 423/244
  896,457  5/1962  United Kingdom................. 423/244

Primary Examiner—Oscar R. Vertiz
Assistant Examiner—Eugene T. Wheelock
Attorney, Agent, or Firm—Craig & Antonelli

[57] ABSTRACT

Carbonaceous materials are impregnated with bromine, chlorine, iodine or their compounds, and brought in contact with a flue gas in the presence of ammonia, whereby nitrogen oxides and sulfur oxides contained in the flue gas are trapped by the carbonaceous materials and can be removed from the flue gas with a very high percent removal.

28 Claims, 4 Drawing Figures

PROCESS FOR REMOVING SULFUR OXIDES AND NITROGEN OXIDES FROM FLUE GASES USING HALOGEN-IMPREGNATED ACTUATED CARBON WITH SIMULTANEOUS INJECTION OF AMMONIA

This invention relates to a process for removing nitrogen oxides and sulfur oxides from a flue gas containing the nitrogen oxides and sulfur oxides.

Combustion apparatuses such as power plant boilers, etc. and internal combustion engines such as automobile engines, etc. have a high combustion temperature, and therefore nitrogen contained in fuel and in combustion air reacts with oxygen to form nitrogen oxides, mostly nitrogen monoxide. The formed nitrogen oxides are exhausted into the atmosphere together with flue gas. Nitrogen monoxide and nitrogen dioxide are also frequently discharged into the atmosphere from plants where nitric acid is handled.

From combustion apparatus such as power plant boilers, etc. sulfur contained in the fuel is exhausted as sulfur oxides together with fuel gas.

It is well known that these nitrogen oxides and sulfur oxides exhausted into the atmosphere are harmful to living things by themselves. Also these oxides exert very harmful influences upon humans as well as animals and vegetables owing to a synergistic effect occurring between these compounds and hydrocarbons, ozone and ultraviolet rays in the atmosphere.

Vigorous research and studies have been made in every field on the removal of these harmful nitrogen oxides and sulfur oxides, and many processes have been so far proposed for removing these oxides from flue gases.

For example, gas absorption by an alkaline solution, washing by a slurry containing magnesium hydroxide, etc. have been proposed to remove nitrogen oxides from a flue gas from power plant boiler, etc., but these prior art methods have many problems such as failure to attain a sufficient percent removal, troublesome post-treatment of the absorbing or washing solution, or complexity of the process.

Furthermore, processes for decomposing and converting nitrogen oxides with various metal catalysts or metal oxide catalysts, which have been proposed mainly for eliminating nitrogen oxides from auutomobile exhaust gas, have not been widely utilized, owing to pending problems such as catalyst life, percent conversion of nitrogen oxides, catalyst prices, etc.

Furthermore, various processes have been developed, as is well known, to remove sulfur oxides from flue gas of power plant boilers, etc., but there are still many problems with respect to their commercial utilization, such as reduction in sizes of the apparatus, simplification of the process, reduction in processing cost, improvement of the percent removal of sulfur oxide, etc., and further advancement is necessary for the processing techniques.

Where both nitrogen oxides and sulfur oxides are discharged together, for example, from power plant boilers, etc., no practical process is yet available for removing these oxides at the same time, and a development for such a process has been keenly desired.

An object of the present invention is to provide a process for removing nitrogen oxides and sulfur oxides from a flue gas in a simple, economical and highly efficient manner, while eliminating the aforementioned various disadvantages encountered in prior art processes.

The object of the present invention can be attained by making a packed layer of carbonaceous material, such as activated carbon, graphite, carbonized char, or amorphous carbon impregnated with bromine, iodine, chlorine or their compounds capable of being decomposed by nitrogen oxide or sulfur oxides, and passing a flue gas containing nitrogen oxides and sulfur oxide through the packed layer, while adding ammonia or its compound to an appropriate position of the packed layer. The nitrogen oxides contained in the flue gas are effectively removed, and at the same time sulfur oxides can be removed.

Figure 2:
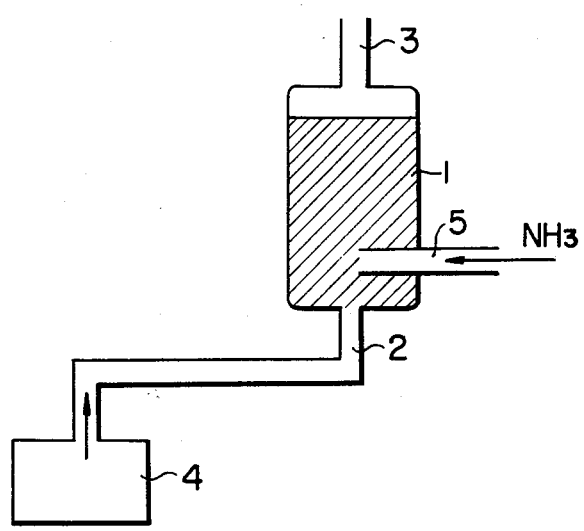
Figure 3:
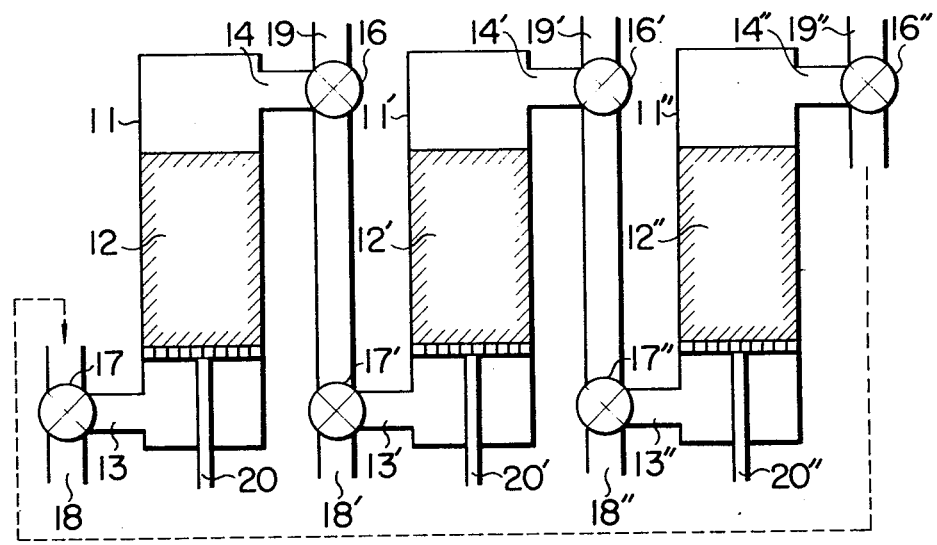
Figure 4:
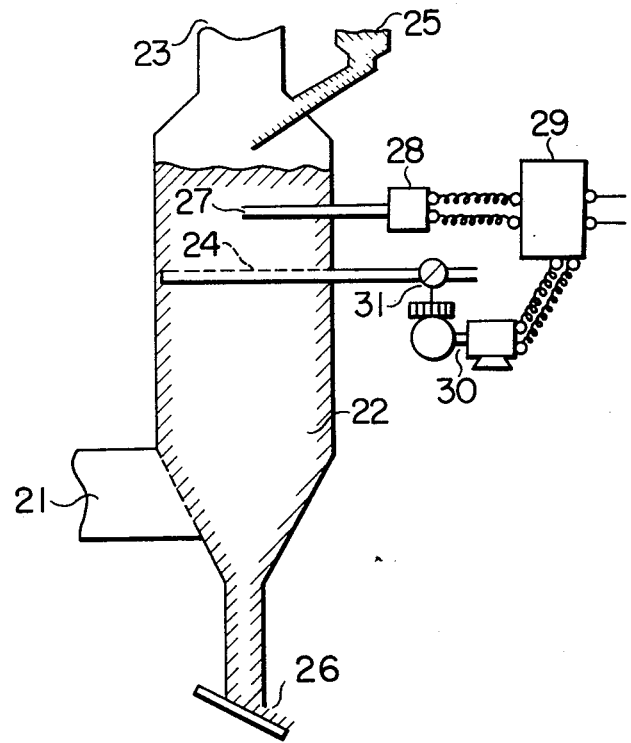

FIGS. 1 and 2 are schematic views for explanation of the principle of the present invention, and FIGS. 3 and 4 are schematic views of respective embodiments of the present invention.

The present invention will be explained, first of all, by way of an example of removing nitrogen oxides and sulfur oxides from a flue gas containing these oxides by contacting the flue gas admixed with ammonia with a packed layer of activated carbon impregnated with bromine or its compound.

In FIG. 1, numeral 1 is a packed layer formed by packing activated carbon, and the activated carbon bears or carries bromine. The bromine can be applied by spraying an aqueous bromine solution of appropriate concentration or a solution of readily decomposable bromine compounds such as ammonium bromide, etc. over the activated carbon or dipping the activated carbon into these solutions.

A flue gas generated in a combustion apparatus 4 is led to a packed layer 1 of activated carbon through an inlet conduit 2 together with ammonia.

The bromine applied to the packed layer 1 of activated carbon reacts with ammonia to form ammonium bromide ($NH_4Br$) and consequently ammonium bromide is held or retained by the packed layer of activated carbon.

It is possible to make the packed layer of activated carbon retain ammonium bromide in other manners. That is, readily decomposable bromine compounds, such as hydrogen bromide can be applied to the packed layer in addition to or in place of bromine, and ammonia can be injected into the packed layer to form ammonium bromide, or ammonium bromide can be applied to the packed layer from the beginning. Of course, the same result can be obtained in this case.

The ammonium bromide reacts with the nitrogen oxides and sulfur oxides in the flue gas to form ammonium nitrate ($NH_4NO_3$), and ammonium sulfate (($NH_4)_2SO_4$) or ammonium sulfite (($NH_4)_2SO_3$) and liberate bromine, as shown in the following equations (1) and (2):

$$2NH_4Br + 2NO + 2O_2 = 2NH_4NO_3 + Br_2 \qquad (1)$$

$$2NH_4Br + SO_2 + O_2 = (NH_4)_2SO_4 = Br_2 \qquad (2)$$

In this manner, the nitrogen oxides and sulfur oxides in the flue gas are adsorbed onto the packed layer of activated carbon, and removed. Purified flue gas is discharged from an exhaust outlet 3.

The bromine liberated according to the reaction shown by the equations (1) and (2) is not adsorbed by the activated carbon to any substantial degree, and is thus liable to be discharged into the atmosphere from the exhaust outlet 3 together with the purified flue gas, but in the present invention, the liberated bromine reacts with ammonia to form ammonium bromide owing to the presence of ammonia, and the resulting ammonium bromide is immediately adsorbed onto the packed layer 1 of activated carbon, and not discharged to the outside.

Furthermore, the ammonium bromide adsorbed on the packed layer 1 of activated carbon serves again to remove nitrogen oxides and sulfur oxides from the flue gas according to equations (1) and (2).

That is to say, the bromine used in the present invention is not discharged to the atmosphere, so far as there is ammonia at the same time, and can be repeatedly used, if the necessary amount of bromine is initially held on the packed layer 1 of activated carbon. This is one of remarkable features of the present invention not seen in the prior art.

Ammonia can be added to the incoming flue gas as shown in FIG. 1, but of course can be directly introduced into the packed layer 1 of activated carbon by providing an appropriate ammonia feed inlet 5, as shown in FIG. 2.

By passing the flue gas through the packed layer of activated carbon impregnated with bromine while injecting ammonia into the flue gas, as described above, the nitrogen oxides are very efficiently removed from the flue gas by the effect of bromine, and no nitrogen oxides are detected at the outlet of the packed layer.

It is apparent from the fact that almost no nitrogen oxides are removed from the flue gas even by adding ammonia to the flue gas when the packed layer of activated carbon contains no bromine, that the bromine very effectively functions to remove the nitrogen oxides.

When ammonium bromide is used as a bromine source, the nitrogen oxides can be removed without any addition of ammonia to the flue gas. However when the period of gas passage is prolonged, it is observed that bromine evolves from the exhaust outlet 3 of the packed layer, and thus the exhaustion of bromine must be prevented by injecting ammonia into the flue gas even in this case.

In the case of sulfur oxides, an equivalent effect of removal to that for the nitrogen oxides is confirmed. However, in case of the sulfur oxides, the sulfur oxides are adsorbed well on the activated carbon flue gas containing a sulfur oxide is passed through a packed layer of activated carbon containing no halogen or halides, removal of the sulfur oxides due to the adsorbability of the activated carbon ocurs, this being different from the case when nitrogen oxides are removed. Furthermore, it is well known that the sulfur oxides are converted to sulfuric acid with oxygen and water vapor in the flue gas, and the resulting sulfuric acid is accumulated in the activated carbon, whereby an effect of removing the sulfur oxides is attained. However, removal of the sulfur oxides can be much improved over the case in which activated carbon alone is used as the absorbent by making the activated carbon hold bromine or bromide, and injecting ammonia into the flue gas, this being due to the same phenomenon as in the case of removal of the nitrogen oxide.

In the foregoing, the effect of removal has been explained in connection with the case in which the activated carbon is impregnated with bromine or bromide, but this remarkable effect is observed not only in the case of bromine or bromide, but also in the case of iodine or iodide, and chlorine or chloride.

It is possible to make the packed layer of activated carbon contain a large amount of bromine, iodine or chlorine, since no bromine, iodine or chlorine is discharged together with the flue gas from the exhaust outlet of the packed layer. A remarkable effect cannot be otained with a very small amount of bromine, iodine or chlorine held on the packed layer. It is usually desirable that the activated carbon contain at least 0.01 g of bromine, iodine or chlorine per kg of the activated carbon. It is also desirable that the activated carbon contain at least 0.01 g of bromides, iodides or chlorides in terms of their halogen element per kg of the activated carbon.

Also, the temperature at which the flue gas is contacted with the carbonaceous material is preferably 60°–150°C.

One of the remarkable features of the present invention is that the presence of carbonaceous packings is indispensable for the progress of said reaction.

That is, when bromine is injected only together with ammonia into the flue gas without a carbonaceous packings it can be presumed that the reaction does not proceed according to the equations (1) and (2), but the reaction proceeds with the nitrogen oxide according to the following equations (3) and (4):

$$2NO + Br_2 = 2NOBr \qquad (3)$$

$$2NOBr + 2NH_3 = NH_4Br + N_2 + H_2O \qquad (4)$$

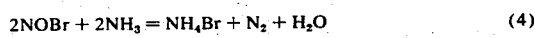

In this case, bromine, etc. are incessantly consumed with the progress of reaction, as is apparent from the equations (3) and (4), and therefore bromine must be always supplied together with ammonia.

Furthermore, the bromine must be supplied exactly in accordance with the content of the nitrogen oxides in the flue gas, and if the bromine is supplied in excess, the bromine is passed into the effluent flue gas. If the bromine is supplied in a short amount, the percent removal of the nitrogen oxides is lowered.

On the other hand, in the present invention, the bromine is retained by the carbonaceous packings, and there is no fear at all of its discharge to the outside with the concomitant occurrence of damage. Thus even the bromine is excessively held on the carbonaceous packings, because of the repeated use of the bromine. That is, no additional supply of the bromine is necessary at all if it is held initially on the carbonaceous packings. This will make the present invention economically very advantageous.

According to the present invention, not only the nitrogen oxides but also sulfur oxides can be well removed, but no sulfur oxides can be removed almost at all, if there are no carbonaceous packings. Therefore, the effect of the carbonaceous packings is quite remarkable in this respect.

Activated carbon is most effective as the carbonaceous packings. Further, many other carbonaceous materials such as graphite, amorphous carbon, carbonized char (charcoal, cokes, etc.) can be used, though their effects are less than that of the activated carbon.

One of the reasons that the effect of the activated carbon is considerably larger than those of other carbonaceous materials is a very large surface area of the activated carbon.

However, comparison of the effect of the activated carbon with that of the carbonized char having a relatively large surface area reveals that the effect of the activated carbon upon the removal of the nitrogen oxides is far greater than that expected from the ratio of surface areas, and it seems that not only larger surface area, but also some catalytic action plays an important role in the case of the activated carbon.

Furthermore, even if other materials having a larger surface area, such as activated alumina, activated silica, etc. are used as a carrier for the bromine, their effect is very low, even compared with the carbonaceous materials having far less surface areas.

It is apparent from these facts that the presence of carbonaceous packed layer is indispensable for the present invention, and a better effect is not expectable, even if other materials having larger surface area are used.

Now, the present invention will be explained in detail by way of examples.

EXAMPLE 1

2 g of activated carbon is filled in a reactor tube having an inner diameter of 12 mm, and the tube is placed in a tubular electric furnace. Then, 0.05 ml of bromine water is sprayed over an activated carbon layer, and a gas mixture containing 700 ppm of nitrogen monoxide, 5% oxygen and 10% water vapor is passed through the activated carbon layer while injecting 1000 ppm of ammonia into the gas mixture. The nitrogen monoxide concentration reaches almost zero at the outlet of the reactor tube at 60° to 150°C. At that time, the ammonia must be injected into the gas mixture in an amount equivalent to or in a little excess of the amount of nitrogen monoxide, whereby the ammonia concentration of the effluent gas can be kept to less than 10 ppm. At the initial stage of gas passage, it is necessary to inject into the gas mixture an excess amount of ammonia which is presumed to be consumed by the bromine initially sprayed and held by the activated carbon layer. At a low temperature of the activated carbon layer, ammonia is accumulated on the activated carbon by adsorption, and therefore it is necessary to supply ammonia in excess. When the gas mixture is treated, while repressing the ammonia concentration of the effluent gas from the reactor tube to zero or very small value in view of the aforegoing points, nitrogen monoxide can be removed at a percent removal of more than 90% for more than a few hours, while observing no exhaustion of the bromine at all in the effluent gas.

EXAMPLE 2

An aqueous solution of ammonium bromide is added to activated carbon to prepare the activated carbon containing 0.02 g of ammonium bromide per ml. of the activated carbon. When the same gas containing nitrogen monoxide as in Example 1 is treated with 2 g of the activated carbon in the same apparatus as used in Example 1, while injecting 1000 ppm of ammonia into the gas mixture, the nitrogen monoxide concentration can be repressed to almost zero at the outlet of the reactor tube, and the similar effect of nitrogen mono-oxide removal to that of Example 1 can be obtained. In this case, there is no consumption of ammonia by bromine at the initial stage of gas passage, as observed in Example 1, and therefore, it is not necessary to especially inject an increased amount of ammonia at the initial stage.

EXAMPLE 3

2 grams of activated carbon containing 20% of ammonium iodide per weight of the activated carbon is filled in the same apparatus as used in Example 1. A gas mixture containing 1000 ppm of nitrogen monoxide, 5% of oxygen, 10% of water vapor and the balance being nitrogen is passed through said activated carbon layer while injecting 1000 ppm of ammonia into the gas mixture. The percent removal of nitrogen monoxide at the outlet of the reactor tube was 98%.

EXAMPLE 4

A gas mixture containing 730 ppm of sulfur dioxide, 10% water vapor, and 5% oxygen is passed through the same apparatus filled with 2 g of activated carbon containing 0.02 g of ammonium bromide per ml of the activated carbon at a flow rate of 200 ml/min., effects of removal, as shown in Table 1, are obtained at 60° to 150°C.

Table 1

| Time of gas passage (hr) | Percent $SO_2$ removal | | |
| --- | --- | --- | --- |
| | Containing No $NH_4Br$ and no $NH_3$ injection | Containing $NH_4Br$ but no $NH_3$ injection | Containing $NH_4Br$ and 1000 ppm $NH_3$ injection |
| 1 | 70 % | 100 % | 100 % |
| 2 | 40 % | 95 % | 100 % |
| 5 | 20 % | 80*% | 95 % |
| 10 | 10 % | 70*% | 90 % |

Remark:
*Occurrence of bromine is observed at the outlet of the packed layer

In the case of activated carbon bearing ammonium bromide, much better percent removal can be obtained, though the ammonia is not injected, than in the case of only activated carbon, as shown in Table 1. However, when the time of gas passage exceeds about 5 hours, it is observed that bromine evolves at the outlet of the packed layer, and the percent removal is gradually lowered. On the other hand, when the gas is passed through the activated carbon containing ammonium bromide, while injecting ammonia into the gas, it is observed that no bromine evolves at the outlet of the packed layer, as shown in Table 1, and the percent sulfur dioxide removal can be kept as high as 90% even after 10 hours of gas passage.

EXAMPLE 5

When a gas mixture containing 730 ppm of sulfur dioxide, 10% water vapor, and 5% oxygen is passed through 1 g of activated carbon containing 0.1 g of ammonium chloride or ammonium iodide per ml of the activated carbon in the same apparatus as in Example 1 at a flow rate of 200 ml/min, effects of removal, as shown in Table 2, are obtained at 130°C. As evident from Table 2, both ammonium chloride and ammonium iodide are effective, and particularly ammonium iodide is more effective.

Table 2

| Time of gas passage | Percent $SO_2$ removal | | |
| --- | --- | --- | --- |
| | Activated carbon with no ammonium salts | Ammonium chloride containing | Ammonium iodide containing |
| 0.5 | 47 | 80 | 100 |

Table 2-continued

| Time of gas passage | Percent SO₂ removal | | |
|---|---|---|---|
| | Activated carbon with no ammonium salts | Ammonium chloride containing | Ammonium iodide containing |
| 1 | 44 | 77 | 100 |
| 2 | 35 | 68 | 100 |
| 3 | — | — | 98 |

When the treatment is carried out while injecting ammonia, the reduction in percent removal can be made less in this case, and of course chlorine or iodine can be prevented from evolving from the gas outlet of the activated carbon layer.

As is apparent from the foregoing examples, the presence of halogens such as chlorine, bromine and iodine or ammonium salts of these halogens in the packed layer of carbonaceous materials such as activated carbon, etc. is effective for the removal of nitrogen oxides and sulfur oxides, and therefore aqueous solutions of halogen, or any other materials capable of being converted to halogen or ammonium salt of halogen at the gas treating conditions of the present invention can be used as the halogen or halides to be added to the packed layer of the carbonaceous materials. Likewise an aqueous solution of ammonia, ammonium carbonate, etc. can be used as an ammonia source.

In the foregoing examples, nitrogen monoxide is used as the nitrogen oxides, because nitrogen monoxide takes the most portion of the nitrogen oxides not only in the boiler flue gas, but also in the automobile exhaust gas, and it is important to eliminate the nitrogen monoxide. Nitrogen dioxide is contained also in the flue gas as other nitrogen oxide, but its removal can be more readily carried out according to the present invention, than the removal of nitrogen monoxide. As to the sulfur oxides, sulfur dioxides take the most portion of the sulfur oxides in the combustion flue gas from boiler, etc. and therefore its removal is very important. Sulfur trioxide, if contained in a small amount in the flue gas, can be more readily removed according to the present invention, than sulfur dioxide.

As described above, the nitrogen oxides and sulfur oxides can be removed from the flue gas at a very high percent removal.

However, when the flue gas contains a small amount of nitrogen oxides and sulfur oxides, the flue gas treatment can be carried out by the apparatus as shown in FIGS. 1 or 2 for a relatively long period of time, but if their contents are large, the adsorption cannot be carried out in a relatively short period of time, and the packed carbonaceous adsorbent must be regenerated, for example, by water washing.

FIG. 3 is a schematic view showing a process for continuously effecting the treatment for a long period of time.

That is to say, the first and second packed columns provided with a flue gas inlet, treated gas outlet, and an inlet for injecting ammonia or an ammonium compound, and also packed layers of carbonaceous materials within the respective columns are connected to each other in series. At least one of bromine, iodine and chlorine is applied to the packed layer of the first packed column, and then a flue gas is introduced into the first packed column together with ammonia or the ammonium compound to adsorb sulfur oxides and/or nitrogen oxides contained in the flue gas onto the packed layer of the first packed column as ammonium salts and thereby remove the sulfur oxides and/or nitrogen oxides from the flue gas. At that time, the halogen liberated in the first packed column is led to the second packed column together with the treated gas to make the liberated halogen adsorb onto the packed layer of the second packed column and thereby remove the halogen from the treated gas. At that time, said halogen can be adsorbed and removed as ammonium salts in the second packed column by injecting ammonia or the ammonium compound to the second packed column. Then, the treated gas is released to the atmosphere from the second packed column. In the foregoing procedure, halogen is applied to the packed layer of the first packed column, but an ammonium salt of halogen can be applied to the packed layer. In that case, ammonia or its compound is not introduced at all or only a small amount of the ammonia or its compound is not introduced into the flue gas to remove the sulfur oxides and/or the nitrogen oxides, and the liberated halogen can be removed in the second packed layer. When the efficiency of the packed layer of the first packed column to remove the sulfur oxides and/or nitrogen oxides is lowered, the introduction of the flue gas is discontinued for a moment, and the regeneration of the packed layer of the first packed column is carried out. At the same time, the connection in series of the packed columns is reversed, so that the second packed column having the packed layer containing said halogen or its ammonium salt may be followed by the first packed column having the regenerated packed layer. The sulfur oxides and/or nitrogen oxides are removed in the second packed column, and said halogen is removed in the first packed column in this reversed series. Then, the regeneration of one packed column and the reversing of the connection of these two packed columns are repeatedly carried out. More preferably, a third packed column having a packed layer of carbonaceous materials is further provided, and when the efficiency of the first packed column to remove the sulfur oxides and/or nitrogen oxide is lowered, the introduction of the flue gas is switched to the second packed column from the first packed column, and at the same time, the third packed column is connected to the second packed column to effect the flue gas treatment through these second and third packed columns, whereas the first packed column is subjected to the regeneration treatment. Thereafter, the switching and regeneration of the packed columns are successively repeated.

In FIG. 3, numerals 11, 11' and 11'' are the first, second and third packed columns having packed layers 12, 12' and 12'' of activated carbon, respectively, and a gas outlet 14 of the first packed column 11 and a gas inlet 13' of the second packed column 11' are connected to each other through switching valves 16 and 17'. A gas outlet 14' of the second packed column 11' and a gas inlet 13'' of the third packed column 11'' are connected to each other through switching valves 16' and 17'. Further, a gas outlet 14'' of the third packed layer 11'' and a gas inlet 13 of the first packed column 11 are connected to each other through switching valves 16' and 17. Numerals 18, 18' and 18'' are flue gas inlets, numerals 19, 19' and 19'' treated gas outlets, and numerals 20, 20' and 20'' inlets for injecting ammonia or ammonium compounds.

First of all, bromine is applied to the packed layer 12 of the first packed column 11, and then a flue gas containing sulfur dioxide is introduced into the first packed column 11 from the flue gas inlet 18, and ammonia from the injection inlet 20. At first, the bromine impregnated on the activated carbon reacts with ammonia to form ammonium bromide, and the resulting ammonium bromide immediately reacts with sulfur dioxide in the flue gas, whereby sulfur dioxide is converted to ammonium salt, which is adsorbed onto the packed layer 12, while bromine is liberated. The treated gas containing the bromine is led to the second packed column 11' from the gas outlet 14 through the valves 16 and 17' and the gas inlet 13', and at the same time ammonia is injected from the injection inlet 20'. Bromine reacts with ammonia to form ammonium bromide, which is adsorbed and accumulated on the packed layer 12' of activated carbon. In this manner, sulfur dioxides is removed from the flue gas by the packed layer 12, and the generated bromine is removed by the packed layer 12'. The purified gas is passed through the gas outlet 14' and the valve 16', and discharged to the atmosphere from the treated gas outlet 19. In the foregoing, explanation is made of the case where the bromine is held on the packed layer of the first packed column, but the foregoing flue gas treatment is applicable also to the case where ammonium bromide is held on the packed layer.

If such treatment is continuously carried out for a long time, the amount of bromine or ammonium bromide held on the packed layer 12 of the activated carbon in the first packed column 11 is reduced to a very small one. Therefore, the valve 17 is switched so that the flue gas may be led to the second packed column 11' having a packed layer 12' of activated carbon, on which bromine or ammonium bromide is accumulated, from the flue gas inlet 18' through the valve 17', and the valves 16' and 17'' are switched so that the second packed column 11' and the third packed column 11'' may be connected to each other. At the same time, ammonia is injected into the third packed column 11'' from the injection inlet 20''.

In the same manner as described above, sulfur dioxide is removed from the flue gas by the packed layer 12', and the effluent gas containing the bromine is led to the third packed column 11'' from the gas outlet 14' through the valves 16' and 17'', and the bromine is again converted to ammonium bromide, which is accumulated on the packed layer 12''. The purified gas is discharged to the atmosphere from the treated gas outlet 19''. While the flue gas treatment is carried out in the second packed column 11' and the third packed column 11'', the packed layer 12 of activated carbon of the first packed column 1, which is acumulated with the ammonium salt of sulfur dioxide, is regenerated with water washing, etc.

Then, the flue gas treatment is carried out in the third packed column and the first packed column in the same manner as above.

According to the foregoing procedure, sulfur dioxide can be continuously removed from the flue gas, and the contamination of waste washing water by the bromine can be prevented at the regeneration of the packed layer of activated carbon, and the waste water treatment can be effectively simplified.

Furthermore, if the bromine is initially held on the packed layer of the carbonaceous material in the first packed column, it is not necessary almost at all to make up the bromine later.

Furthermore, ammonium compounds capable of releasing ammonia at several 10 degrees C or more, such as aqua ammonia, and an aqueous ammonium carbonate solution can be used in place of ammonia.

In the foregoing description, the flue gas treatment is directed to removal of sulfur dioxide, and the case where bromine is held on the activated carbon, but sulfur trioxide can be, of course, more readily treated likewise, because the replacement reaction of the bromine of ammonium bromide with sulfur trioxide proceeds considerably more rapidly than that with sulfur dioxide.

When nitrogen monoxide and nitrogen dioxide are contained in the flue gas as nitrogen oxides, these oxides are trapped by the packed layer of carbonaceous materials as ammonium salts, and removed in the same manner as above. Furthermore, iodine and chlorine and likewise utilized as materials held on the packed layer of activated carbon, in addition to the bromine. Furthermore, carbon materials such as graphite, dry-distilled char, etc. can be used as the carbonaceous materials in addition to the activated carbon.

EXAMPLE 6

FIG. 4 is a schematic cross-sectional view of an moving bed-type apparatus for treating a flue gas, to which the present invention is applied.

In FIG. 4, a flue gas containing 750 ppm of nitrogen monoxide at about 130°C is introduced into an activated carbon layer 22 from an inlet 21. At that time, the flue gas is passed through the activated carbon layer at a space velocity (SV) of about 2,500 $hr^{-1}$. When 50 g of ammonium bromide per 1 kg of activated carbon is applied in advance to the lower part of the activated carbon layer 22 (which will be hereinafter referred to an upstream packed layer), the nitrogen monoxide in the flue gas reacts with ammonium bromide on the surfaces of activated carbon to convert the nitrogen monoxide to ammonium salts, and the resulting ammonium salts are accumulated on the activated carbon, where the bromine is liberated, and moved upwards over the packed layer 22, (the upper packed layer will be hereinafter referred to as downstream packed layer), together with the flue gas.

In the downstream packed layer, ammonia is injected from an injection inlet 24, and the bromine ascending from the lower part is converted to ammonium bromide again thereby, and held on the activated carbon, whereby the flue gas is discharged from an outlet 23 as a purified gas containing no nitrogen monoxide and bromine. In that case, the activated carbon is supplied from a make-up inlet 25, and withdrawn from an outlet 26 of the column bottom. Therefore, the ammonium bromide formed at the upper part of the column descends through the column together with the activated carbon, and contacts nitrogen monoxide. The bromine is again liberated and moves upwards through the column.

In this manner, the ammonium bromide is always retained within the column, and only ammonium nitrate or ammonium nitrite converted from nitrogen monoxide is attached to the activated carbon withdrawn from the outlet 26 at the bottom of the column.

However, the operation of the apparatus as such is very difficult. That is, if the amount of ammonia injected is less than the amount of bromine ascending through the column from the lower part, the treated gas evolving from the outlet 23 is contaminated with the bromine. On the other hand, when ammonia is excessively injected, ammonia is liable to be evolved from the outlet 23.

If the content of nitrogen oxides in the flue gas is determined, a state of appropriate injection can be reached for a moment by injecting an equivalent amount of ammonia, but the content of nitrogen oxides largely varies, depending upon the fluctuation in the boiler load. Therefore, it is difficult to carry out continuous operation as it is. When the sulfur oxides are removed from the flue gas as ammonium salts according to the present apparatus, the content of sulfur oxides also varies, depending upon charge in flue gas rate and fuel, and thus the foregoing situation also prevails in the case of removal of the sulfur oxides.

In the present example, such problems are overcome in the following manners. As shown in FIG. 4, a gas sampling tube 27 is provided above the ammonia injection inlet 24, and the gas around the tube is collected and led to a bromine detector 28. When the bromine is detected by the detector 28, a controller 29 connected to the detector 28 starts to work and a blocking means 30 to open or close an ammonia injection valve is actuated, whereby an appropriate amount of ammonia is injected into the column. When the bromine is not detected by the detector 28, the injection valve 31 is closed.

The bromine is detected by the ordinary bromine ion sensitive electrode. The bromine ion sensitive electrode has a good sensitivity of measurement, and a sufficiently satisfactory result can be obtained. However, other bromine detection methods can be, of course, utilized.

As a result of the control of the ammonia injection amount in the manner as mentioned above, no bromine is observed at all in the treated gas evolving from the outlet 23, and the ammonia contamination can be kept below 10 ppm. The percent nitrogen monoxide removal is 92% at that time.

In the foregoing example, explanation is made of the case where the activated carbon is used as the carbonaceous materials, and the nitrogen oxides are removed by ammonium bromide. However, dry distilled char, etc. can be used as the carbonaceous materials, and also the nitrogen oxides can be removed by ammonium chloride, and the sulfur oxides can be removed by ammonium chloride, ammonium iodide, and ammonium bromide. Further, the liberated halogen such as bromine, etc. can be trapped by ammonium compounds capable of releasing ammonia at the flue gas temperature, such as aqua ammonia or an aqueous ammonium carbonate solution, etc. in addition to the ammonia as described above.

What is claimed is:

1. A process for removing at least one nitrogen oxide or sulfur oxide from a flue gas comprising contacting the flue gas in the presence of oxygen with a bed of carbonaceous material selected from the group consisting of activated carbon, graphite, carbonized char and amorphous carbon, said carbonaceous material being impregnated with a halogen or halogen compound selected from the group consisting of iodine, bromine, chlorine, ammonium iodide, ammonium bromide, ammonium chloride, hydrogen iodide, hydrogen bromide and hydrogen chloride, said bed containing at least 0.01 gram of said halogen or at least 0.01 gram of said halogen compound measured in terms of the halogen content of said halogen compound per kilogram of said carbonaceous material, said flue gas being contacted with said bed at a temperature at which the ammonium salt of said halogen or the ammonium salt of the halogen component of said halogen compound can be adsorbed by said carbonaceous material, and simultaneously feeding to said bed ammonia or a compound capable of liberating ammonia at the temperature at which the flue gas contacts said bed so that ammonia contacts said carbonaceous material as said flue gas contacts said carbonaceous material, thereby removing said at least one nitrogen oxide or sulfur oxide from said flue gas.

2. A process according to claim 1, wherein the contact with the flue gas is carried out at a temperature of 60° to 150°C.

3. The process of claim 1, wherein gaseous ammonia is fed to said bed from a source external of the bed.

4. The process of claim 3, wherein the amount of ammonia fed to said bed is approximately equivalent to or in slight excess of the amount of said at least one nitrogen oxide or sulfur oxide on a molar basis.

5. The process of claim 4, wherein the amount of ammonia fed to said bed is approximately equivalent to the amount of said at least one nitrogen oxide or sulfur oxide fed to said bed on a molar basis.

6. The process of claim 1, wherein the amount of ammonia or compound capable of liberating ammonia fed to said bed is approximately equivalent to or in slight excess of the amount of said at least one nitrogen oxide or sulfur oxide on a molar basis.

7. The process of claim 1, wherein an aqueous solution of ammonia or ammonium carbonate is fed to said bed.

8. The process of claim 1, wherein said bed of carbonaceous material is non-fluidized contained in a housing provided with means for moving said bed with respect to said housing in a first direction, said flue gas being passed through said bed in a direction opposite to said first direction.

9. The process of claim 1, wherein said flue gas contains at least one nitrogen oxide.

10. The process of claim 1, wherein said flue gas contains at least nitrogen oxide and at least one sulfur oxide.

11. A process for removing at least one nitrogen oxide or sulfur from a flue gas comprising contacting the flue gas in the presence of oxygen with a bed of a carbonaceous material selected from the group consisting of activated carbon graphite, carbonized char and amorphous carbon, said carbonaceous material being impregnated with bromine, iodine, chlorine, an ammonium salt thereof, or a compound capable of liberating chlorine, bromine, iodine or an ammonium salt thereof under the conditions encountered when said flue gas contacts said bed and simultaneously feeding to said bed of carbonaceous material ammonia or a compound capable of liberating ammonia at the temperature at which the flue gas contacts said bed, thereby removing at least one nitrogen oxide or sulfur oxide from said flue gas, said bed containing at least 0.01 gram bromine, iodine or chlorine per kilogram of said carbonaceous material or a corresponding amount of said ammonium salt or said compound capable of yielding chlorine, bromine, iodine or an ammonium salt thereof, said flue gas being contacted with said bed at a temperature such that the ammonium salt of said bromine, iodine or chlorine can be adsorbed by said carbonaceous material.

12. The process of claim 11, wherein said ammonia is fed to said bed from a source external of said bed.

13. The process of claim 12, wherein the amount of ammonia fed to said bed is approximately equivalent to or in slight excess of the amount of said at least one nitrogen oxide or sulfur oxide on a molar basis.

14. The process of claim 11, wherein an aqueous solution of ammonia or ammonium carbonate is fed to said bed.

15. The process of claim 12, wherein said flue gas is contacted with said carbonaceous material at a temperature of about 60° to 150°C.

16. The process of claim 12, wherein said carbonaceous material contains a sufficient amount of a compound capable of yielding bromine, iodine or chlorine so that the amount of bromine, iodine or chlorine yielded by said compound is at least about 0.01 g. per kg. of cabonaceous material.

17. The process of claim 11, wherein said flue gas contains at least one nitrogen oxide.

18. The process of claim 11, wherein said flue gas contains at least nitrogen oxide and at least one sulfur oxide.

19. The process of claim 11, wherein said carbonaceous material is impregnated with ammonium bromide, ammonium iodide or ammonium chloride.

20. The process of claim 19, wherein said carbonaceous material is impregnated with ammonium iodide.

21. The process of claim 11, wherein said flue gas is contacted with said cabonaceous material at a temperature of about 60° to 150°C.

22. A process for removing at least one nitrogen oxide or sulfur oxide from a flue gas comprising:
A. passing said flue gas through a bed of carbonaceous material containing ammonium iodide, ammonium bromide or ammonium chloride so that (1) said at least one nitrogen oxide or sulfur oxide is retained in said bed in the form of an ammonium salt and (2) iodine, bromine, or chlorine as a by-product is produced in said bed, and
B. feeding simultaneously ammonia to said bed to convert said by-product to an ammonium salt in said bed.

23. The process of claim 22, wherein flue gas is contacted with a plurality of beds arranged in series.

24. The process of claim 23, further comprising regenerating at least one of the beds.

25. A process for removing at least one nitrogen oxide or sulfur oxide from a flue gas comprising contacting the flue gas in the presence of oxygen with a bed of activated carbon impregnated with bromine, iodine, chlorine, an ammonium salt thereof, or a compound capable of liberating bromine, iodine, chlorine, or an ammonium salt thereof under the conditions encountered when said flue gas contacts said bed, and simultaneously feeding to said bed ammonia or a compound capable of liberating ammonia at the temperature at which the flue gas contacts said bed, thereby removing at least one nitrogen oxide or sulfur oxide from said flue gas, said bed containing at least 0.01 gram bromine, iodine or chlorine per kilogram of said activated carbon or a corresponding amount of said ammonium salt or said compound capable of yielding chlorine, bromine, iodine or an ammonium salt thereof.

26. The process of claim 25, wherein gaseous ammonia is fed to said bed from a source external of said bed.

27. The process of claim 25, wherein an aqueous solution of ammonia or ammonium carbonate is fed to said bed.

28. The process of claim 25, wherein said flue gas is contacted with said carbonaceous material at a temperature of about 60° to 150°C.

* * * * *